United States Patent Office 2,839,587
Patented June 17, 1958

2,839,587

PRODUCTION OF ORTHO-METHYLOLPHENOLS

Alaric Louis Jeffrey Raum, Teddington, England, assignor to The Distillers Company Limited, Edinburgh, Scotland, a British company No Drawing. Application April 25, 1955
Serial No. 503,774

Claims priority, application Great Britain April 30, 1954

8 Claims. (Cl. 260—621)

The present invention relates to the production of aqueous solutions containing ortho-methylol phenols and in particular containing a high proportion of ortho-monomethylol phenols. It further relates to the production of saligenin (ortho-hydroxybenzyl alcohol) by the interaction of phenol and formaldehyde.

It is known that saligenin together with other phenol alcohols is initially formed in the condensation of phenol with formaldehyde in the production of resins. However, the reaction by which the saligenin is formed is difficult to control and other condensation products are usually formed. Consequently it has not previously been possible to produce large quantities of substantially pure saligenin or even of reaction mixtures containing saligenin as substantially the only condensation product therein by simple condensation reactions. If strong acids are used to catalyse the condensation of the phenol with the formaldehyde the reaction of the methylol compounds proceeds so rapidly that it is practically impossible to build up any substantial concentration of the saligenin before the reaction proceeds further with the production of higher condensation products and resins. If the condensation of the phenol with the formaldehyde is carried out under weakly acid conditions under the influence of mild catalysts of the type that have previously been employed the rate of formation of the saligenin is considerably reduced with the result that longer condensation times have to be employed. As a result of these difficulties the usual method of producing saligenin as a pure chemical compound has previously been by the reduction of the expensive and not readily available ortho-hydroxybenzaldehyde.

A further difficulty in the production of ortho-monomethylol phenols from the interaction of formaldehyde with phenols under both acid and alkaline conditions is that the reaction gives rise to a mixture of isomers in which the methylol groups are either ortho- or para- to the phenolic hydroxyl groups. For instance, in the condensation of phenol with formaldehyde it is found that, under the influence of most of the commonly used condensation catalysts, including strongly alkaline catalysts such as sodium hydroxide, the initially formed monomethylol phenol consists of a mixture of both the ortho- and para- isomers.

The object of the present invention is to provide a process for the production of ortho-methylol phenols, containing a high proportion of the mono-methylol phenols, directly from the interaction of the appropriate phenol with formaldehyde by a process which does not involve the production of high proportions of unwanted para-isomers or other condensation products.

It has now been found that, if phenol, meta-cresol or meta-ethyl phenol is condensed with aqueous formaldehyde in the presence of organic acid salts of certain divalent metals, a rapid reaction of the phenol with the formaldehyde occurs to give a high yield of the ortho-methylol phenol compounds consisting primarily of the mono-methylol isomers. Surprisingly it has been found that substantially no para-isomers are formed.

Accordingly, the present invention provides a process which comprises condensing a molar excess of phenol, meta-cresol or meta-ethyl phenol with formaldehyde or a formaldehyde producing agent in an aqueous reaction mixture having a pH value in the range 4 to 7 and in the presence of a salt of a divalent electro-positive metal with an organic acid, which salt is at least partially soluble in the reaction mixture, at a temperature not substantially above the reflux temperature of the mixture to give a product containing ortho-methylol phenols as substantially the only phenol-formaldehyde condensation products therein.

By molar excess of the monohydric phenol is meant that the molar ratio of the phenol to formaldehyde present in the reaction mixture is greater than 1:1. In practice it is found necessary if high yields are to be obtained, to employ a phenol:formaldehyde ratio greater than 1.3:1, and most suitably it is about 2:1.

There is no upper limit to the phenol:aldehyde molar ratio, but generally it is preferred not to have it greatly above 2:1 for economic reasons because it is usually preferable to remove the unreacted phenol when the desired concentration of mono-methylol phenols has been built up. The removal of unreacted phenol is essential when it is desired to isolate saligenin from the reaction mixture.

The formaldehyde is most suitably added to the reaction mixture as an aqueous solution such as formalin but formaldehyde-producing agents may be used. Such agents are those compounds, such as paraformaldehyde, which produce formaldehyde under the conditions of the condensation reaction.

The catalysts employed in the process of the present invention are the divalent electropositive metal salts of weak organic acids. By an electropositive metal is meant a metal which is more electropositive than hydrogen in the electromotive series. It is important that the metals employed should form stable ions in the reaction mixture. Examples of such metals are barium, strontium, calcium, magnesium, manganese, zinc, cadmium, cobaltous cobalt and lead. Any weak organic acid salt of these metals may be used as catalyst provided that it is at least partially soluble in the aqueous reaction mixture and is capable of maintaining the reaction mixture in the desired pH range. Particularly suitable are the salts of the simple carboxylic acids such as benzoic acid, formic acid, acetic acid and lactic acid. As examples of particularly useful catalysts may be mentioned zinc acetate, zinc formate, cadmium acetate, cadmium formate and magnesium formate.

The precise amount of catalyst used in the process may be varied widely depending upon the catalyst chosen and the reactivity of the monohydric phenol employed. Generally the amount of catalyst employed will lie within the range 0.1 to 5.0% by weight on the monohydric phenol present. It should be noted that as the molar ratio of phenol to formaldehyde employed in the reaction is reduced the initial reaction tends to go more slowly and it is often advisable to use a relatively higher concentration of catalyst.

The pH value of the reaction mixture of the present invention must be within the range of 4 to 7 and preferably between 5 and 6 in order that high yields of ortho-methylol phenols may be obtained. If desired the pH of the reaction mixture may be adjusted by the addition of suitable acids or bases, although it is preferred that sufficient catalyst is used to bring and maintain the pH value of the reaction mixture into the desired range. The pH of the system is most conveniently determined using a conventional pH meter with a glass electrode which may be immersed directly in the reaction mixture at 20° C.

The reaction of the monohydric phenol with the formaldehyde to produce the ortho-methylol phenols is brought about by mixing the phenol and the formaldehyde together and adding the catalyst to the mixture. This mixture is then heated gently until reaction occurs. The temperature of the reaction may be controlled by heating the mixture under reflux conditions.

The reaction may be allowed to proceed until substantially all the formaldehyde has reacted and the heating of the reaction mixture should not be continued after this point has been reached. When it is desired to produce an aqueous reaction mixture containing a high proportion of a monomethylol phenol, for instance in the preparation of saligenin, the condensation of the formaldehyde is not allowed to proceed to completion and the condensation reaction is discontinued when about 70% of the formaldehyde has been consumed.

The process of the present invention lends itself readily to the production of saligenin by the condensation of phenol and formaldehyde. The process as described above is carried out to produce an aqueous solution having a high concentration of saligenin together with a small proportion, usually between ⅛ to ⅙ of the saligenin, of 2,6-dimethylol phenol. The saligenin is readily recovered in a pure state from this solution by many different techniques which are well known to those skilled in the art. Usually the first step comprises the low temperature distillation of the mixture under reduced pressures. This distillation of the reaction mixture may be continued to remove excess phenol by increasing the temperature of the distillation. During such distillation processes the temperature of the reaction mixture should not be allowed to exceed 100° C. and preferably it is maintained below 95° C. The residue obtained from the distillation step will consist primarily of saligenin and it is found most surprisingly that other isomers and higher condensation products are substantially absent if the reaction conditions have been carefully controlled. The saligenin is often most suitably recovered from such residues by the addition thereto of a suitable solvent to give a solution from which the saligenin may be crystallised. Suitable solvents are carbon tetrachloride, tri-chloroethylene and benzene.

An alternative isolation procedure which may be applied to the reaction mixture either before or after the water and/or the excess phenol have been distilled therefrom, is that known as countercurrent extraction. In such a procedure the reaction mixture containing the saligenin is mixed with two immiscible solvents in such a manner that the saligenin is concentrated in one solvent whereas the excess monohydric phenol and other impurities in the reaction mixture are concentrated in the other. Such isolation procedures may be carried out as a series of separate extraction processes or continuously in an extraction column in which the two solvents flow countercurrently. In order to increase the yield of saligenin it is often advisable to remove the salt catalyst before isolating the monomethylol phenol from the reaction mixture. This is particularly advisable when water and/or excess monohydric phenol is to be removed from the reaction mixture by distillation at elevated temperatures. When the salt catalyst is not completely soluble in the reaction mixture it is removed therefrom by cooling and then filtering the reaction mixture.

In addition to providing a means for the production of saligenin, the present invention provides a process for the production of reaction mixtures containing a high proportion of ortho-methylol phenols derived from phenol, meta-cresol and meta-ethyl phenol. The particular advantage of these mixtures is that surprisingly they contain substantially no para-isomers nor, if the process has been carried out under the conditions outlined above, any substantial amounts of polynuclear phenol condensation products.

It is known to produce moulding powders by impregnating suitable fillers with mixtures of phenol alcohols and in particular in British Patent 697,626 such moulding powders are prepared from aqueous solutions of pure monomeric phenol alcohols. The aqueous solutions produced by the process of the present invention may be used in like manner to prepare similar moulding powders which have the additional advantage of rapid cure which is believed to be a result of the high proportion of ortho-methylol phenols in the mixture and the substantial absence of any para-isomers.

The aqueous solutions produced by the present invention may be dehydrated, most suitably by vacuum distillation to give substantially anhydrous mixtures comprising ortho-methylol phenols, principally the mono-methylol compounds, as the only phenol condensation products present. Such mixtures find many uses, particularly in the production of very reactive moulding powders.

The following examples illustrate the production of saligenin from the interaction of phenol with formaldehyde.

Example 1

A quantity of phenol and formaldehyde, in the form of formalin, were mixed together in the proportions, 2 moles of phenol to 1 mole of formaldehyde, to give a mixture to which 1% by weight on the phenol of zinc acetate was added. The mixture having a pH of 5.6 was slowly heated and was allowed to reflux for 60 minutes after which time the formaldehyde had completely reacted to give a reaction mixture consisting almost entirely of saligenin and excess phenol. Water and excess phenol were removed as rapidly as possible from the stirred mixture by distillation under vacuum, the temperature not exceeding 100° C. The residue from the distillation was then shaken with carbon tetrachloride and allowed to stand for 13 hours, during which time the saligenin crystallised out. This product had a melting point of 76–77° C. and was purified by recrystallisation from carbon tetrachloride to give a substantially pure product with a melting point of 85° C.

Essentially similar results are obtained by repeating the process of Example 1, replacing the zinc acetate catalyst with an equivalent amount of zinc formate or cadmium acetate.

Examples 2–4

The process of Example 1 was repeated but different reaction times and/or catalysts were employed. The aqueous reaction mixture comprising the saligenin was subjected to a rapid vacuum distillation up to 100° C. to remove water and unreacted phenol and the crude product was isolated by the addition of the carbon tetrachloride followed by cooling of the mixture. The pure product was obtained by recrystallisation from carbon tetrachloride. The ingredients used and the results obtained are given below:

500 parts by weight of phenol ⎱ mol ra-
219.0 parts by weight of 36.8% w./v. Formalin ⎰ tio 2:1
5 parts by weight of catalyst

| Example No. | Catalyst | Reflux, Minutes | Crude Saligenin | | Percent Yield of pure product |
|---|---|---|---|---|---|
| | | | Percent Yield | M. P. | |
| 2 | Zinc acetate | 40 | 53 | 65 | 21 |
| 3 | do | 50 | 32 | 74 | 16.5 |
| 4 | Cadmium formate | 60 | 50 | 77 | 16 |

The yields are expressed as a percentage of the maximum theoretically possible based on the formaldehyde employed.

Example 5

A similar process to that described in Example 1 was carried out employing a 3:1 molar ratio of phenol to formaldehyde and the reflux period was maintained for 40 minutes. A 52% yield of crude product with a melting point of 67° C. was obtained and recrystallised to give an overall yield of 15% of pure saligenin.

Example 6

A similar process to that described in Examples 2 to 4 was carried out using 1% by weight on the phenol of magnesium formate as catalyst. After a reflux period of 40 minutes a 20% yield of crude saligenin (melting point 70° C.) was recovered.

Example 7

540 parts by weight of meta-cresol containing 1% by weight thereof of zinc acetate were heated for 80 minutes at 70° C. with 250 parts by weight of 36.3% formalin. At this stage 83% of the formaldehyde had reacted and the heating was stopped and the aqueous mixture was analysed chromatographically. It was found to contain a high proportion of ortho-methylolated products and substantially no para-isomer or higher condensation products could be detected.

Similar results are obtained by repeating the process of Example 7, using manganese formate or acetate, or magnesium acetate, or cobalt acetate in place of the zinc acetate as catalyst.

Examples 8 to 10

A series of aqueous solutions comprising saligenin and 2:6-dimethylol phenol as chief phenol-formaldehyde condensation products were obtained by refluxing an aqueous mixture of phenol and formaldehyde (mol ratio 2:1) for varying times using 1% on the phenol of zinc acetate as catalyst and the solutions so produced were analysed chromatographically. The results obtained are shown in the following table:

| Example No. | Reflux time (mins.) | Percent HCHO reacted | Percent saligenin in mixture | Percent 2,6-di-methylol phenol in mixture |
|---|---|---|---|---|
| 8 | 30 | 72 | 27.5 | 3.0 |
| 9 | 60 | 90 | 34.5 | 4.0 |
| 10 | 90 | 100 | 38 | 4.2 |

I claim:

1. A process which comprises condensing a molar excess of a monohydric phenol selected from the group consisting of phenol, meta-cresol and meta-ethyl phenol with formaldehyde in an aqueous reaction mixture having a pH value in the range 4 to 7 and in the presence of a salt of a divalent electro-positive metal with an organic acid, which salt is at least partially soluble in the reaction mixture, by heating the reaction mixture to a temperature not above the reflux temperature of the mixture to give a product containing ortho-methylol phenols, and discontinuing the heating when substantially all the formaldehyde has reacted.

2. A process as claimed in claim 1, wherein the molar ratio of the phenol to formaldehyde is about 2:1.

3. A process as claimed in claim 1, wherein the salt catalyst employed is selected from the group consisting of zinc acetate, zinc formate, cadmium acetate, cadmium formate and magnesium formate.

4. A process as claimed in claim 1, wherein the condensation is carried out under reflux conditions.

5. A process for the production of ortho-methylol phenol which comprises reacting phenol in a process as claimed in claim 1, and recovering ortho-methylol phenol from the product.

6. A process for the production of ortho-methylol phenol which comprises reacting phenol in a process as claimed in claim 1, and distilling the product under reduced pressure at a temperature not above 100° C. until substantially all the water and free phenol has been removed therefrom and recovering ortho-methylol phenol from the residue by the addition thereto of a solvent from which ortho-methylol phenol may be crystallised.

7. A process for the production of ortho-methylolphenol which comprises condensing a molar excess of a monohydric phenol selected from the group consisting of phenol, meta-cresol and meta-ethyl phenol with formaldehyde in an aqueous reaction mixture having a pH value in the range 4 to 7 and in the presence of a salt of a divalent electro-positive metal with an organic acid, which salt is at least partially soluble in the reaction mixture, by heating the reaction mixture to a temperature not above the reflux temperature of the mixture to give a product containing ortho-methylol phenols, and discontinuing the heating when substantially all the formaldehyde has reacted, and then distilling the product under reduced pressure at a temperature not above 100° C. until substantially all the water and free phenol has been removed therefrom and recovering ortho-methylol phenol from the residue by the addition thereto of carbon tetrachloride.

8. A process which comprises condensing a molar excess of a monohydric phenol selected from the group consisting of phenol, meta-cresol and meta-ethyl phenol with formaldehyde in an aqueous reaction mixture having a pH value in the range 4 to 7 and in the presence of a salt of a divalent electro-positive metal with an organic acid, which salt is at least partially soluble in the reaction mixture, by heating the reaction mixture to a temperature not above the reflux temperature of the mixture to give a product containing ortho-methylol phenols, and discontinuing the heating when about 70% of the formaldehyde has reacted.

References Cited in the file of this patent
UNITED STATES PATENTS 563,975 Lederer _____ July 14, 1896
2,744,882 Bender et al. _____ May 8, 1956

OTHER REFERENCES

Sugimoto, Chem. Abstracts, vol. 25 (1931) col. 3322–3 (2 pp.).